US006244705B1

United States Patent
Ledbetter et al.

(12) United States Patent
(10) Patent No.: US 6,244,705 B1
(45) Date of Patent: Jun. 12, 2001

(54) AUXILIARY CORRECTIVE EYEGLASSES FOR USE WITH PRIMARY EYEGLASSES

(76) Inventors: Donald L. Ledbetter, 10721 Woodriden St., Oklahoma City, OK (US) 73170; Samuel C. Oliphant, Jr., 9516 Regal La., Oklahoma City, OK (US) 73162

( * ) Notice: Subject to any disclaimer, the term of this patent is extended or adjusted under 35 U.S.C. 154(b) by 0 days.

(21) Appl. No.: 09/513,392

(22) Filed: Feb. 25, 2000

Related U.S. Application Data

(63) Continuation-in-part of application No. 09/342,005, filed on Jun. 28, 1999, now abandoned.

(51) Int. Cl.[7] ............................................. G02C 7/08
(52) U.S. Cl. ................................. 351/57; 351/41
(58) Field of Search ....................... 351/57, 47, 54, 351/61, 41

(56) References Cited

U.S. PATENT DOCUMENTS

| 0,709,874 | * | 9/1902 | Cohen | 351/57 |
|---|---|---|---|---|
| 2,901,752 | * | 9/1959 | Granger | 351/57 |
| 4,163,607 | | 8/1979 | Nannini | 351/47 |
| 4,659,196 | | 4/1987 | Gazeley | 351/57 |
| 5,007,727 | * | 4/1991 | Kahaney et al. | 351/57 |
| 5,056,906 | | 10/1991 | Akiyoshi | 351/57 |
| 5,118,178 | * | 6/1992 | Tuckman | 351/57 |
| 5,416,537 | | 5/1995 | Sadler | 351/47 |
| 5,428,407 | | 6/1995 | Sheffield | 351/58 |
| 5,493,348 | | 2/1996 | Herald, Jr. et al. | 351/57 |
| 5,568,207 | | 10/1996 | Chao | 351/47 |
| 5,598,232 | | 1/1997 | Pronesti | 351/54 |
| 5,608,470 | | 3/1997 | Sheffield | 351/47 |
| 5,642,177 | | 6/1997 | Nishioka | 351/47 |

(List continued on next page.)

FOREIGN PATENT DOCUMENTS 58-5714 * 1/1983 (JP) ......................... 351/57

OTHER PUBLICATIONS

Excerpt from 1997 Brochure by Vicron Optical of Glenview, IL, showing "Slip–In Myds" (3 pages).
Pages from shades.com website showing "Compu–Clip" half–eye glasses (2 pages) published prior to Jun. 28, 1999.
Pages from biznet.maximizer.com website showing "Flip–Focals" glasses (2 pages) published prior to Jun. 28, 1999.
Page from neoptx.com website showing "Optx 20/20" sunglass readers (1 page) published prior to Jun. 28, 1999.
Printout of TiredEyes.com webpage illustrating PC Lens (4 pages) published by TiredEyes.com, Inc. of Latham, NY prior to Jan. 2, 2000.

*Primary Examiner*—Huy Mai
(74) *Attorney, Agent, or Firm*—Mary M. Lee

(57) ABSTRACT

Auxiliary "task-distance" eyeglasses for use with conventional corrective eyeglasses to eliminate the constant head tilting otherwise necessary to maintain focus when using only the conventional lenses. The auxiliary glasses have upper partial lenses that correct mid-range vision, the focal length required for viewing a computer screen, reading piano music, viewing an instrument panel, or any other arms' length task. The zone of mid-range correction extends across the full width of the lenses. The lenses of the auxiliary glasses are connected by a bridge and supported on the primary glasses by two short tabs that extend sidewardly so as to rest on the temple members of the primary glasses. No clips or clamps are involved, so the auxiliary glasses simply "drop in" behind the regular glasses, avoiding damage to either the primary or the auxiliary lenses. This configuration makes the auxiliary glasses less obtrusive than conventional clip-on lenses. Moreover, the auxiliary glasses can be formed inexpensively in one piece of molded plastic, and can be sold without a prescription.

27 Claims, 3 Drawing Sheets

U.S. PATENT DOCUMENTS

| | | | |
|---|---|---|---|
| 5,694,192 | 12/1997 | Lucki et al. | 351/47 |
| 5,696,571 | 12/1997 | Spencer et al. | 351/47 |
| 5,710,614 | 1/1998 | Cereda | 351/57 |
| 5,724,118 | 3/1998 | Krebs | 351/57 |
| 5,737,054 | 4/1998 | Chao . | |
| 5,774,200 | 6/1998 | Markey | 351/47 |
| 5,790,230 | 8/1998 | Sved | 351/138 |
| 5,801,804 | 9/1998 | Pennise | 351/47 |
| 5,867,244 | 2/1999 | Martin | 351/47 |
| 6,027,214 * | 2/2000 | Graham | 351/57 |

* cited by examiner

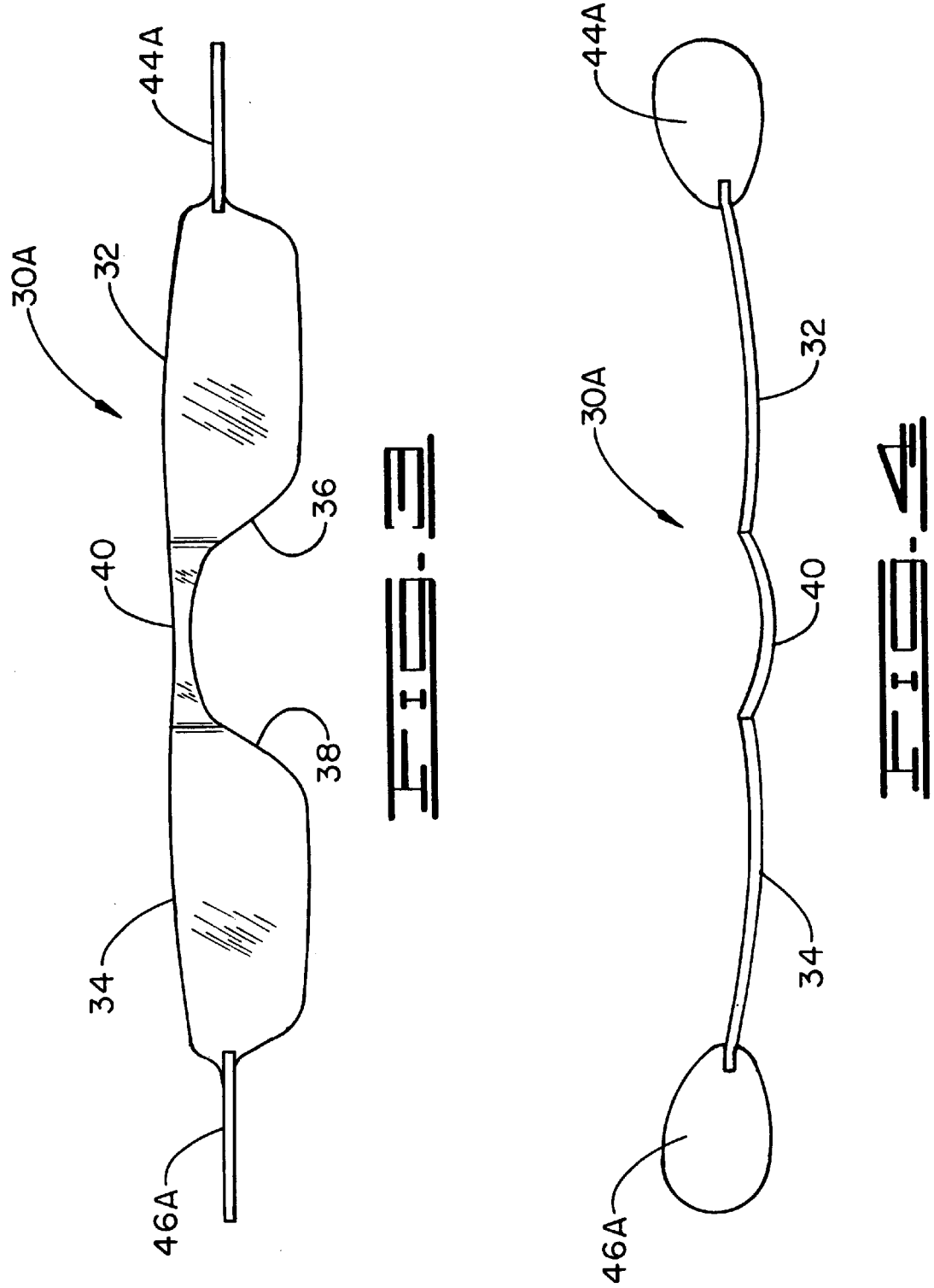

AUXILIARY CORRECTIVE EYEGLASSES FOR USE WITH PRIMARY EYEGLASSES

This application is a continuation-in-part of application Ser. No. 09/342,005 filed Jun. 28, 1999, entitled "Auxiliary Corrective Eyeglasses for use with Primary Eyeglasses", now abandoned.

FIELD OF THE INVENTION

The present invention relates generally to eyeglasses and, more particularly, to auxiliary eyeglasses for use with primary eyeglasses for temporary supplemental vision correction.

BACKGROUND OF THE INVENTION

Prescription eyeglasses utilize a wide variety of lenses with several types of correction. Among the most common corrective lenses are bifocals, which have a full field lens with a zone in the bottom portion of each lens that corrects close range vision for reading. Depending on the needs of the wearer, the upper portion or zone of a bifocal lens may or may not correct for better long-range or distance vision. Unfortunately, for most bifocal wearers, neither the short-range correction nor the long-range correction of their glasses corrects sufficiently for the mid-range of vision. It is the mid-range of vision that is utilized when viewing a computer screen, piano music and many other tasks performed at about arm's length.

In trifocal lenses and in the more recently developed "progressive" lenses, there is a narrow zone that corrects mid-range vision. However, a computer user wearing such lenses must tilt his head up and down until the mid-range portions of his lenses are aligned with the computer screen. This corrects the user's vision, but often does so at the expense of the user's comfort and good body mechanics.

There is a need for auxiliary eyeglasses for temporary mid-range correction, which can be worn with the conventional lenses and only when needed, such as while using a computer or playing a piano. This eliminates the constant head tilting required when using the conventional lenses alone. There is a need for such auxiliary eyeglasses that provide a wide zone of correction, preferably across the full width of the lenses. There is also a need for such auxiliary eyeglasses that can be worn with the user's primary corrective eyeglasses. Further, there is a need for such auxiliary eyeglasses that are sturdy and inexpensive. Further still, there is a need for such auxiliary eyeglasses that are simple to attach to and remove from the primary eyeglasses in a manner that reduces the likelihood of damage to the primary lenses.

SUMMARY OF THE INVENTION

The present invention comprises auxiliary eyeglasses for use with primary eyeglasses, wherein the primary eyeglasses comprise a pair of lenses. The auxiliary eyeglasses comprise a pair of corrective, partial lenses, each having a nasal side. A bridge connects the nasal sides of the upper partial lenses to each other. At least one tab extends outwardly from the partial lenses, and the tab is sized and positioned to rest non-engagingly on the primary eyeglasses when the lenses of the auxiliary eyeglasses are positioned behind the lenses of the primary eyeglasses.

Still further, the present invention comprises an eyeglass assembly. The assembly includes a pair of primary eyeglasses and a pair of auxiliary eyeglasses. The primary eyeglasses comprise a pair of full, corrective lenses. The auxiliary eyeglasses comprise a pair of corrective, upper partial lenses, each having a nasal side. A bridge connects the nasal sides of the upper partial lenses to each other. At least one tab extends outwardly from the upper partial lenses, and the tab is sized and positioned to be supported by the primary eyeglasses when the lenses of the auxiliary eyeglasses are positioned behind the lenses of the primary eyeglasses.

BRIEF DESCRIPTION OF THE DRAWINGS

FIG. 3 is a front elevational view of a second embodiment of the auxiliary eyeglasses of the present invention.

FIG. 4 is a plan view of the auxiliary eyeglasses of FIG. 4.

FIG. 5 is a front elevational view of the eyeglass assembly of the present invention illustrating the concealment of the auxiliary eyeglasses behind the primary eyeglasses.

DETAILED DESCRIPTION

Figure 1:
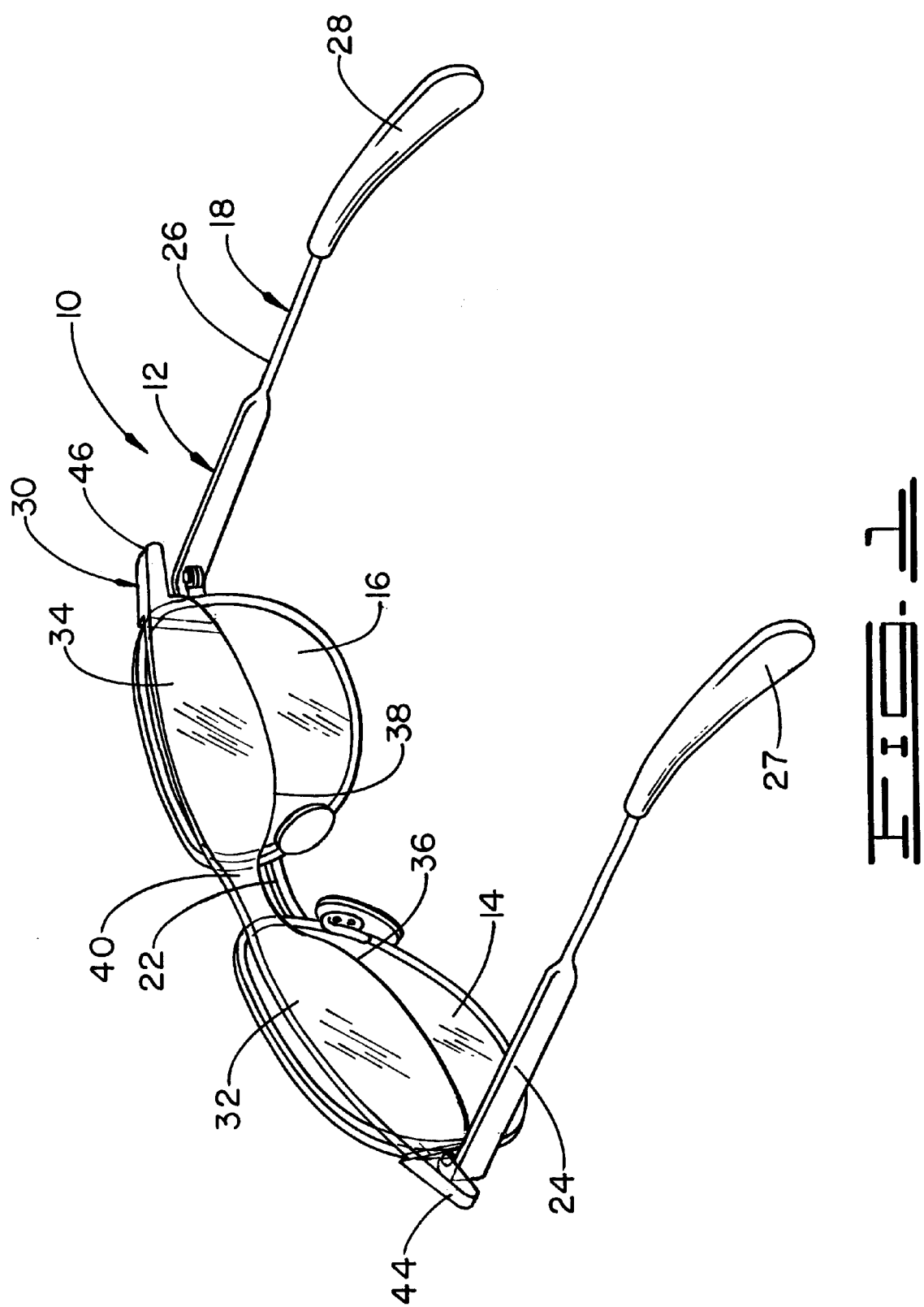
FIG. 1 is a rear perspective view of the eyeglass assembly of the present invention comprising a pair of primary eyeglasses and a pair of auxiliary eyeglasses.
Figure 1:
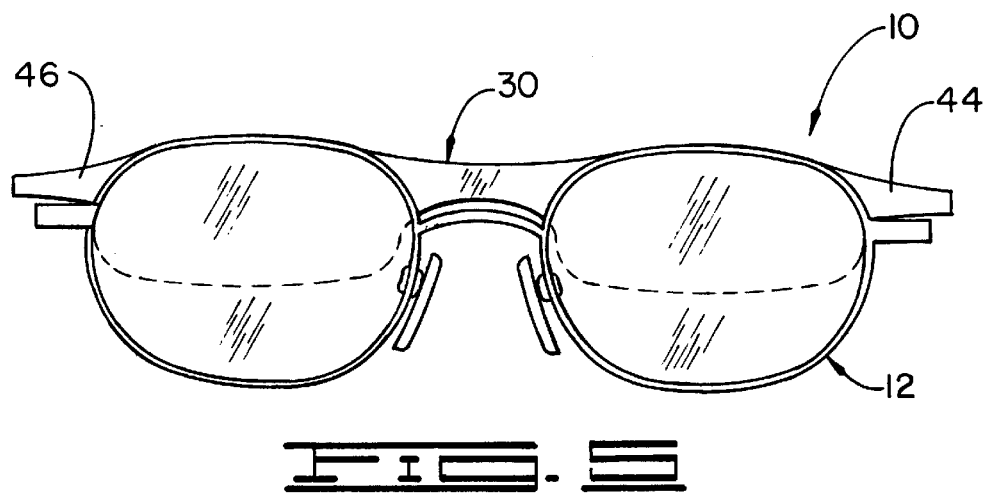
Figure 2:
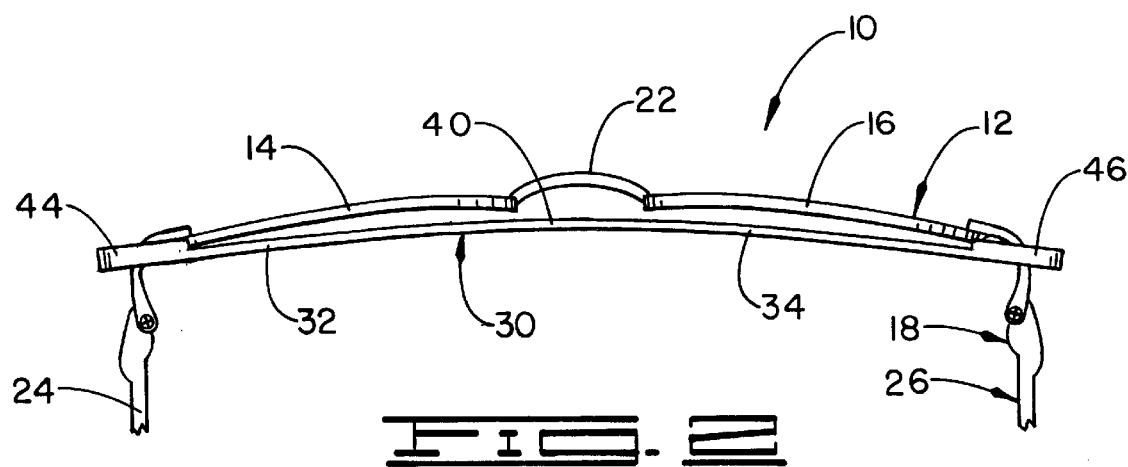
FIG. 2 is a partially fragmented, plan view of the eyeglass assembly of FIG. 1.

Turning now to the drawings in general and to FIGS. 1 and 2 in particular, there is shown therein an eyeglass assembly designated generally by the reference numeral 10. The eyeglass assembly 10 comprises a pair of primary eyeglasses 12. The primary eyeglasses comprise a pair of lenses 14 and 16, usually corrective, supported by a frame 18. In most instances, the frame 18 comprises a bridge 22, which extends between the lenses 14 and 16, and pair a of temple members 24 and 26, which extend a distance backward from the lenses. Typically, the temple members 24 and 26 will terminate in curved earpieces 27 and 28.

The lenses 14 and 16 of the primary glasses 12 are full lenses. As used herein, "full lens" refers to a lens that is intended to provide the full field of vision vertically as well as laterally. In most instances, the lenses 14 and 16 will be corrective. As used herein "corrective" means lenses capable of changing the focal length, and does not include lenses that are merely protective in nature such as safety glasses and sunglasses.

If corrective, the full field may be a single correction. Alternately, the field of the lens may be divided into two or more zones. For example, in the case of bifocals, a zone in the lower portion of the lens is corrected for short-range or reading distance, which is up to about 14 to about 18 inches from the eyes. In most bifocals, the remainder of the field either is not corrected or is corrected for long-range or distance vision. Typically long-range correction provides a focal length greater than about 42 inches from the eyes.

In the case of trifocals, there is a narrow zone in the middle of the lens that corrects for mid-range, which provides a focal length of from about 16 inches to about 42 inches. Trifocals will usually have a lower zone for short-range correction, as in bifocals and an upper zone for distance vision as well.

With continuing reference to FIGS. 1 and 2, the eyeglass assembly 10 also comprises a pair of auxiliary eyeglasses 30. The auxiliary glasses 30 comprise a pair of corrective, upper partial lenses 32 and 34. As used herein, "partial lens" denotes less than a full field of vision. More specifically, a partial lens is shorter than the full lens so as not to be vertically coextensive with the lenses of the primary eyeglasses. The partial lens allows the wearer unaltered use of the lower portion of the primary lenses, which is usually for short-range correction or reading. The mid and upper portions, however, preferably are provided with a normal or full width. As best seen in FIG. 1, the partial lenses 32 and 34 have nasal sides 36 and 38 connected by a bridge 40.

The auxiliary eyeglasses 30 also comprise at least one tab extending outwardly from the partial lenses. More preferably, the auxiliary eyeglasses 30 comprise two tabs 44 and 46 extending either forwardly or sidewardly from the lenses 32 and 34, respectively. The tabs 44 and 46 are sized and positioned to be supported by the primary eyeglasses 12 so that the auxiliary eyeglasses 30 are supportable behind the primary glasses 12. Preferably, the tabs 44 and 46 are shaped to rest on the frame 18 of the primary eyeglasses 12. Of course, in the case of rimless lenses, the tabs could rest directly on the upper edges of the lenses 14 and 16.

As shown in FIGS. 1 and 2, the tabs 44 and 46 preferably are shaped to rest non-engagingly on the primary eyeglasses 12. More preferably, the tabs 44 and 46 extend sidewardly and perpendicularly to the temple members 24 and 26 and simply ride or rest on the primary eyeglasses. As shown, the tabs 44 and 46 may be short, straight stubs without clips or clamps of any sort.

Attention now is directed to FIGS. 3 and 4, which illustrate a second embodiment of the auxiliary eyeglasses of the present invention. In this embodiment, the auxiliary eyeglasses 30A are similar to the eyeglasses 30 of the previous embodiment in that they generally comprise a pair of partial, corrective lenses 32 and 34 connected by a bridge 40.

The auxiliary lenses 30A comprise modified tabs 44A and 46A that are generally planar and are oriented horizontally. The paddle-shaped tabs 44A and 46A are especially well suited to rest non-engagingly on the temple members of the primary glasses, as previously described. The relatively broad, planar surface of this embodiment minimizes rocking or rotation of the auxiliary eyeglasses while resting on the primary eyeglasses. This shape also provides a convenient handle for manipulating the auxiliary lenses, which have no temple members to grasp.

Now it will be seen that the auxiliary eyeglasses have no hinged member and have a single field correction (mid-range, preferably). Thus, lenses, bridge and tabs forming the auxiliary glasses can be integrally formed, preferably of a synthetic resin such as polycarbonate, or another suitable transparent, moldable plastic material. More preferably, the lenses are injection molded, as this will reduce the manufacturing costs.

It will now be appreciated that one of the primary advantages of the auxiliary glasses of the present invention is that they will simply "drop in" behind the lenses of the primary glasses. No positioning, no intricate connection, clamp or fitting must be manipulated. This not only simplifies the use of the auxiliary glasses, but also virtually eliminates the likelihood that either the primary lenses or the auxiliary lenses will be scratched or otherwise damaged while operating a more complex clamp or clip device. Indeed, the primary glasses need not even be removed to insert or to remove the auxiliary glasses.

Still further, the auxiliary glasses will work with virtually any size or style of conventional primary glasses. The auxiliary glasses do not have to be custom fitted to the primary glasses, and the primary glasses do not have to be modified in any way. The large mid-range correction field provided by the auxiliary glasses will correct for the lack of any mid-range corrective field in conventional lenses, or will substantially expand the corrected field in trifocals and progressive lenses, which provide only a narrow, localized zone of mid-range correction.

Thus, the auxiliary glasses of this invention permit those who wear conventional corrective eyeglasses to augment those lenses instantly, but temporarily, with additional wide area correction for mid-range or "task distance" vision. Moreover, this correction is across the entire width of the primary lenses, but leaves unaltered the reading or short-range zone in the lower portion of the primary lenses. This allows the user to move his gaze back and forth between the task area and reading material without removing the auxiliary glasses, and without tilting his head at an uncomfortable angle. The comfort and convenience of the "task" lenses of this invention will be equally appreciated by anyone performing a task at about arms' length, such as computer users, pianists and other musicians who must read sheet music on a music stand, and air traffic controllers required to read instrument panels.

Yet another advantage of the present invention is illustrated in FIG. 5, to which attention now is directed. The auxiliary glasses, once in place behind the primary glasses, are not readily noticeable. Only the tabs are visible, though not conspicuous, extending a short distance on either side of the primary glasses. Thus, the auxiliary glasses do not detract aesthetically from the user's appearance, which can be important in the workplace where computer use often occurs in the presence of coworkers, customers or other members of the public.

Changes can be made in the combination and arrangement of the various parts and elements described herein without departing from the spirit and scope of the invention as defined in the following claims.

What is claimed is:

1. Auxiliary eyeglasses for use with primary eyeglasses, wherein the primary eyeglasses comprise a pair of lenses, the auxiliary eyeglasses comprising:
   a pair of corrective, partial lenses, each having a nasal side;
   a bridge connecting the nasal sides of the upper partial lenses to each other; and
   at least one tab extending outwardly from the partial lenses, each tab sized and positioned to rest non-engagingly on the primary eyeglasses when the lenses of the auxiliary eyeglasses are positioned behind the lenses of the primary eyeglasses.

2. The auxiliary eyeglasses of claim 1 comprising two tabs, one extending outwardly from each of the partial lenses.

3. The auxiliary eyeglasses of claim 2 wherein the lenses, bridge and tabs are integrally formed.

4. The auxiliary eyeglasses of claim 3 formed of plastic.

5. The auxiliary eyeglasses of claim 2 wherein the tabs extend sidewardly or forwardly.

6. The auxiliary eyeglasses of claim 5 wherein the tabs extend sidewardly.

7. The auxiliary eyeglasses of claim 6 wherein the tabs are generally planar and are oriented horizontally.

8. The auxiliary eyeglasses of claim 1 wherein the partial lenses are upper partial lenses.

9. The auxiliary eyeglasses of claim 8 wherein the lenses are characterized as correcting mid-range vision.

10. The auxiliary eyeglasses of claim 9 wherein the lenses, bridge and tabs are integrally formed.

11. The auxiliary eyeglasses of claim 10 formed of plastic.

12. The auxiliary eyeglasses of claim 11 comprising two tabs, one extending sidewardly from each of the partial lenses.

13. The auxiliary eyeglasses of claim 12 wherein the tabs are generally planar and are oriented horizontally.

14. The auxiliary eyeglasses of claim 1 comprising two tabs, one extending sidewardly from each of the partial lenses and wherein the tabs are generally planar and are oriented horizontally.

15. An eyeglass assembly comprising:

primary eyeglasses comprising a pair of fill, corrective lenses; and auxiliary eyeglasses comprising:
- a pair of corrective, upper partial lenses, each having a nasal side;
- a bridge connecting the nasal sides of the upper partial lenses to each other; and
- at least one tab extending outwardly from the upper partial lenses, the tab being sized and positioned to be supported by the primary eyeglasses when the lenses of the auxiliary eyeglasses are positioned behind the lenses of the primary eyeglasses.

16. The eyeglass assembly of claim 15 wherein the auxiliary eyeglasses comprise two tabs, one extending outwardly from each of the upper partial lenses.

17. The eyeglass assembly of claim 16 wherein the lenses, bridge and tabs of the auxiliary eyeglasses are integrally formed.

18. The eyeglass assembly of claim 17 wherein the auxiliary eyeglasses are formed of plastic.

19. The eyeglass assembly of claim 16 wherein the tabs of the auxiliary eyeglasses extend sidewardly or forwardly.

20. The eyeglass assembly of claim 19 wherein the primary glasses comprise a pair of temple members extending backwardly a distance from the lenses, and wherein the tabs of the auxiliary eyeglasses extend sidewardly and perpendicular to the temple members.

21. The eyeglass assembly of claim 20 wherein the tabs of the auxiliary eyeglasses rest non-engagingly on the temple members of the primary eyeglasses.

22. The eyeglass assembly of claim 21 wherein the tabs are generally planar and are oriented horizontally.

23. The eyeglass assembly of claim 15 wherein the tab of the auxiliary eyeglasses rests non-engagingly on the primary eyeglasses.

24. The eyeglass assembly of claim 23 wherein the lenses of the auxiliary eyeglasses are characterized as correcting mid-range vision.

25. The eyeglass assembly of claim 24 wherein the lenses, bridge and tabs of the auxiliary eyeglasses are integrally formed of plastic.

26. The eyeglass assembly of claim 23 wherein the auxiliary eyeglasses comprise two tabs, one extending sidewardly from each of the upper partial lenses.

27. The eyeglass assembly of claim 26 wherein each of the tabs is generally planar and is oriented horizontally.

* * * * *